United States Patent [19]
Allison

[11] Patent Number: 5,426,346
[45] Date of Patent: Jun. 20, 1995

[54] GAS DISCHARGE LAMP BALLAST CIRCUIT WITH REDUCED PARTS-COUNT STARTING CIRCUIT

[75] Inventor: Joseph M. Allison, Euclid, Ohio

[73] Assignee: General Electric Company, Schenectady, N.Y.

[21] Appl. No.: 209,092

[22] Filed: Mar. 9, 1994

[51] Int. Cl.⁶ ............................................. H05B 37/02
[52] U.S. Cl. .................... 315/209 CD; 315/209 T; 315/209 SC; 315/209 M; 315/289; 315/290
[58] Field of Search .................... 315/290, 289, 209 T, 315/209 CD, 209 SC, 209 M

[56] References Cited

U.S. PATENT DOCUMENTS 4,723,097  2/1988  Heindl et al. ............... 315/290 X
4,904,907  2/1990  Allison et al. ............. 315/209 T X
4,975,624 12/1990  Soileau et al. ............. 315/290 X Primary Examiner—Robert J. Pascal
Assistant Examiner—Reginald A. Ratliff
Attorney, Agent, or Firm—George E. Hawranko; Stanley C. Corwin

[57] ABSTRACT

Disclosed is an electronic ballast circuit for a high pressure gas discharge lamp with a reduced parts-count starting circuit. The circuit comprises an arrangement for supplying d.c. voltage from a d.c. source, and a main inductor for receiving energy from the d.c. source and supplying the energy to the lamp. The main inductor has a plurality of windings. A first winding of the inductor is coupled to receive energy from the d.c. source. Further included is a current-switching arrangement conductive during periodic first part cycles for transferring energy from the d.c. source to the main inductor, and non-conductive during periodic second part cycles. A first part cycle is followed by a second part cycle in successive periods of switching operation of the current-switching arrangement. The first winding of the main inductor has impressed across it substantially the d.c. source voltage during the first part cycles, and reflects substantially the lamp voltage during the second part cycles. The circuit further includes a starting circuit for providing a pulse in excess of 15,000 volts across the lamp to facilitate starting the lamp. The starting circuit comprises a spark gap device, a pulse transformer, and a voltage-generating circuit. The voltage-generating circuit comprises a starting capacitor for storing energy and impressing across a spark gap an increasing voltage, which reaches the breakdown voltage of the spark gap during a lamp start-up period, and also a circuit for charging the starting capacitor with energy from the main inductor during the second part cycles.

13 Claims, 3 Drawing Sheets

GAS DISCHARGE LAMP BALLAST CIRCUIT WITH REDUCED PARTS-COUNT STARTING CIRCUIT

FIELD OF THE INVENTION

The present invention relates to an electronic ballast, or power supply, circuit for a high pressure gas discharge lamp, and, more particularly, to such a ballast circuit that incorporates a reduced parts-count starting circuit.

BACKGROUND OF THE INVENTION

High pressure discharge lamps, such as xenon metal halide lamps, employ an electronic ballast circuit for starting the lamp, and for powering the lamp during steady state lamp operation. High pressure discharge lamps, especially those operating at pressures greater than about 0.5 atmospheres, require a very high voltage impressed across the lamp to start. Such starting voltage typically exceeds more than about 15,000 volts, and may even exceed more than about 20,000 volts. A prior art approach to designing an appropriate electronic ballast circuit has been to utilize two separate sets of electrical components: one set of components for starting the lamp and another set of components for running the lamp.

As a general matter, however, it is desirable to reduce the number of electrical components that make up an electronic ballast circuit. This reduces the cost of the circuit, and also its size, a factor becoming increasingly important in size-limited environments, such as in automobiles. It would, accordingly, be desirable to provide an electronic ballast circuit for a high pressure discharge lamp that requires fewer parts to implement a lamp-starting function.

OBJECTS AND SUMMARY OF THE INVENTION

It is, therefore, an object of the invention to provide an electronic ballast circuit for a high pressure gas discharge lamp, which ballast circuit employs a reduced-parts count starting circuit.

A further object of the invention is to provide the foregoing electronic ballast circuit without sacrificing reliability over prior art circuits having a separate starting circuit.

A still further object of the invention is to provide an electronic ballast circuit of the foregoing type that places the start circuit in an automatic idling mode after the lamp starts.

Another object of the invention is to provide an electronic ballast circuit of the foregoing type that provides an automatic restart function in the event of accidental lamp turn-off.

In accordance with the invention, there is provided an electronic ballast circuit for a high pressure gas discharge lamp with a reduced parts-count starting circuit. The circuit comprises means for supplying d.c. voltage from a d.c. source, and a main inductor for receiving energy from the d.c. source and supplying the energy to the lamp. The main inductor has a plurality of windings. A first winding of the inductor is coupled to receive energy from the d.c. source. Further included is current-switching means conductive during periodic first part cycles for transferring energy from the d.c. source to the main inductor, and non-conductive during periodic second part cycles. A first part cycle is followed by a second part cycle in successive periods of switching operation of the current-switching means. The first winding of the main inductor has impressed across it substantially the d.c. source voltage during the first part cycles, and reflects substantially the lamp voltage during the second part cycles. The circuit further includes a starting circuit for providing a pulse in excess of 15,000 volts across the lamp to facilitate starting the lamp. The starting circuit comprises a spark gap device, a pulse transformer, and a voltage-generating circuit. The spark gap device includes a spark gap that has a breakdown voltage at which the device conducts to provide a pulse of current. The pulse transformer has a primary winding coupled to the pulse-generating device for receiving the pulse of current, and has a secondary winding coupled to the lamp for applying to the lamp a voltage in excess of 15,000 volts while the pulse is present, so as to facilitate starting of the lamp. The voltage-generating circuit is effective for impressing across the pulse-generating device a voltage that reaches the breakdown voltage of the spark gap during a lamp start-up period, resulting in a pulse of current through the spark gap device. The voltage-generating circuit comprises a starting capacitor for storing energy and impressing across the spark gap an increasing voltage, which reaches the breakdown voltage of the spark gap during a lamp start-up period, and also a circuit for charging the starting capacitor. The latter circuit comprises a one-way current valve and a starting winding of the main inductor coupled to the starting capacitor via the one-way current valve, so as to be effective to charge the capacitor with energy from the main inductor during the second part cycles.

BRIEF DESCRIPTION OF THE DRAWING FIGURES

The foregoing, and further, objects and advantages of the invention will become apparent from the following description when read in conjunction with the drawing, in which.

Figure 3:
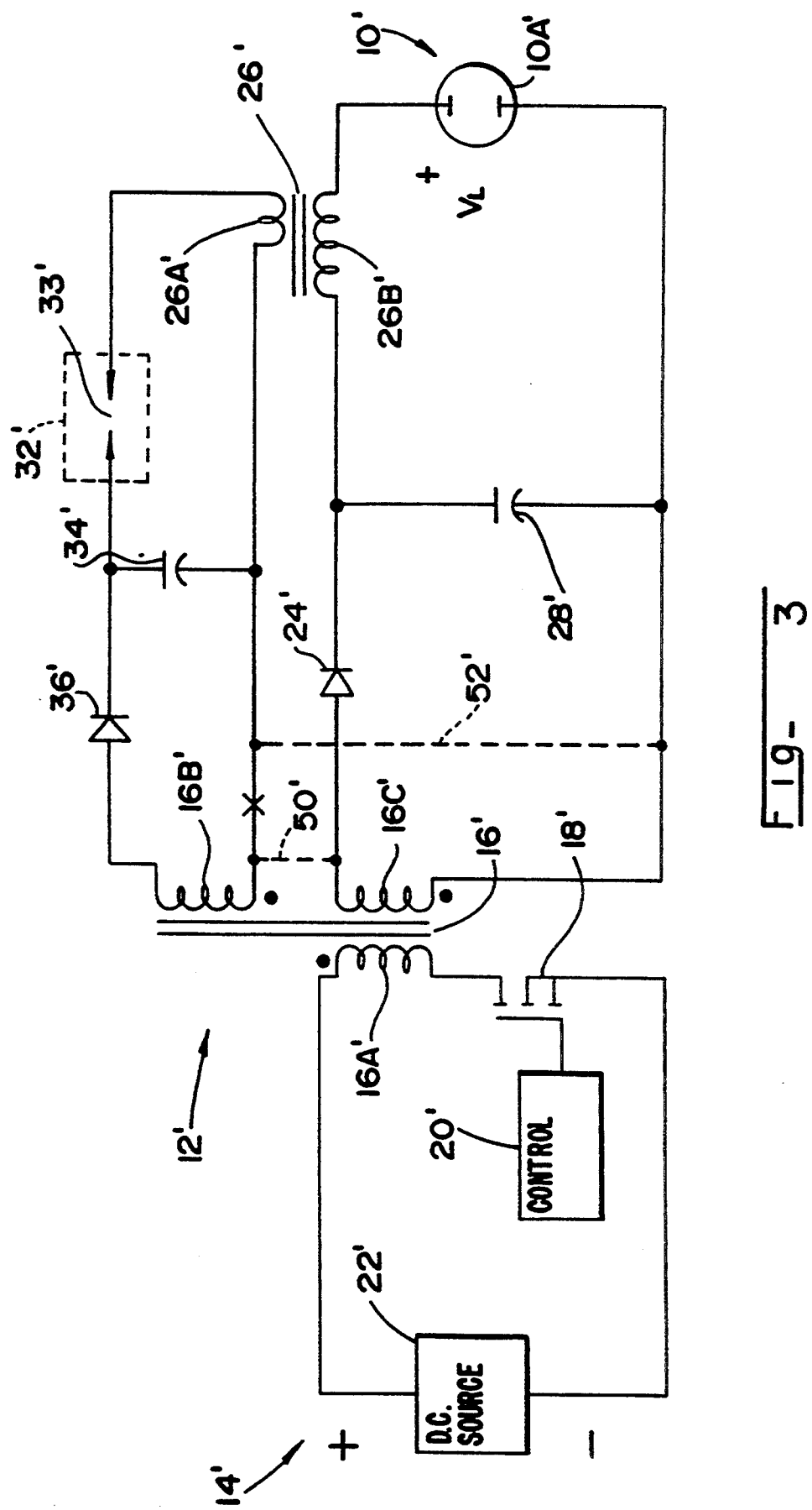

FIG. 3 a schematic diagram, partially in block form, of an electronic ballast circuit for a high pressure discharge lamp employing a flyback converter circuit topology and having a reduced parts-count starting circuit, in accordance with a second embodiment of the invention.

DESCRIPTION OF THE PREFERRED EMBODIMENTS

Figure 1:
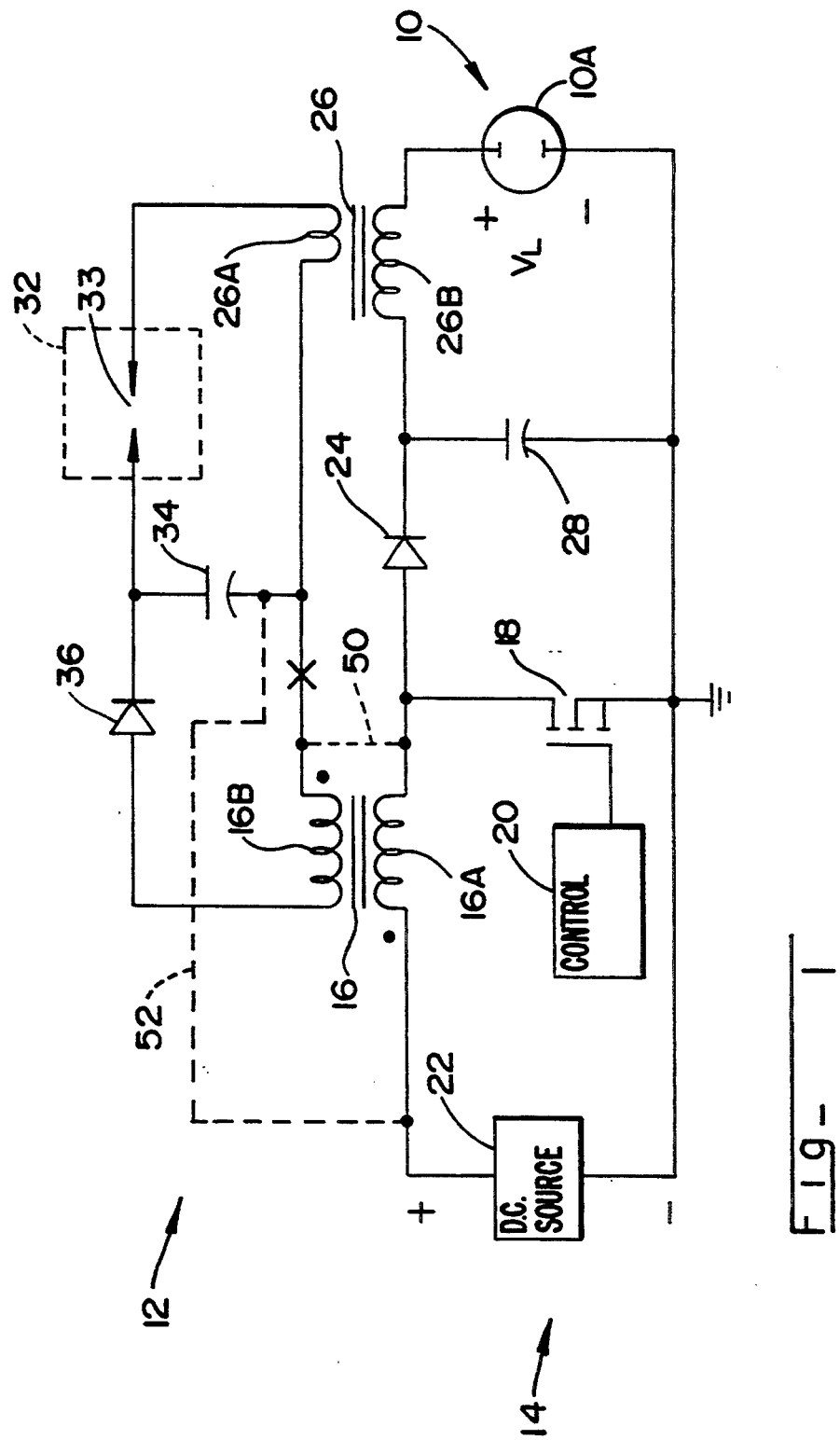
FIG. 1 is a schematic diagram, partially in block form, of an electronic ballast circuit for a high pressure discharge lamp employing a boost converter circuit topology and having a reduced parts-count starting circuit, in accordance with a first embodiment of the invention.

FIG. 1 shows an exemplary ballast circuit for a high pressure discharge lamp, generally designated 10. Lamp 10 may comprise a high pressure xenon metal halide discharge lamp of the type disclosed, for instance, in U.S. Pat. No. 4,868,458, which is assigned to the same assignee as the instant application. Starting of lamp 10 requires that a high voltage be applied across the lamp. For instance, where envelope 10A of lamp 10 contains a gaseous mixture under a pressure higher than about 0.5 atmospheres, starting of the lamp typically requires that a voltage in excess of about 15,000 volts be applied across the lamp. Some lamps may require even higher starting voltages, for instance, more than 20,000, or even, 25,000 volts. Such high voltage is generated by a starting circuit 12. Starting circuit 12 cooperates with a main ballast circuit 14 that provides steady state power to operate the lamp.

Figure 2:
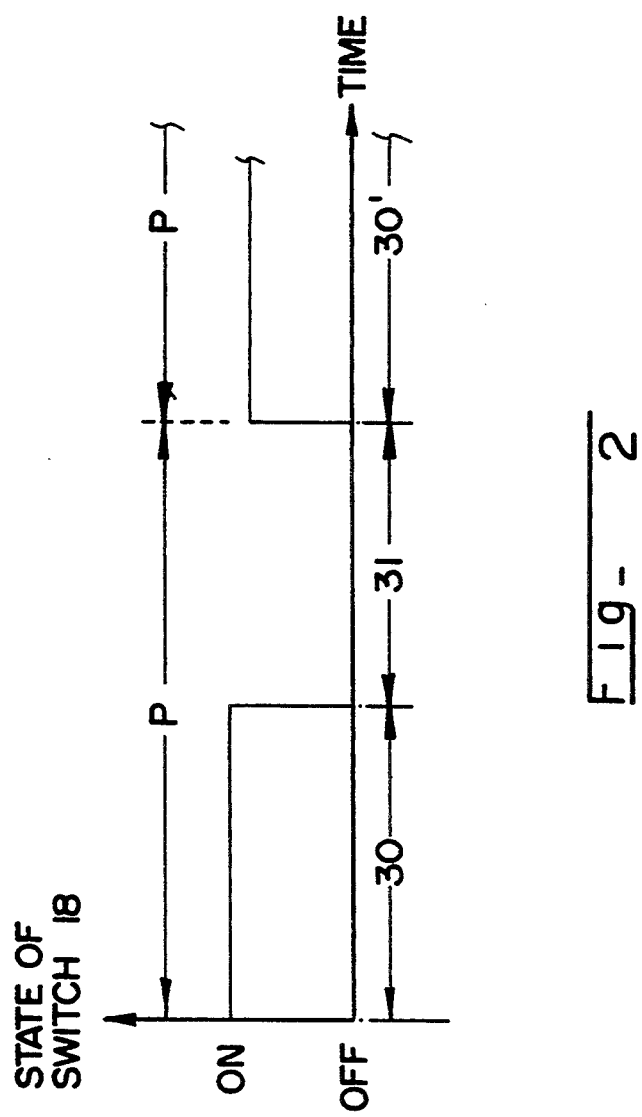
FIG. 2 is a diagram illustrating the conducting state of a current switch used in the circuit of FIG. 1.

Main ballast circuit 14 may incorporate different circuit topologies, as will become apparent from the instant specification. In the topology shown in FIG. 1, main ballast circuit 14 incorporates a so-called boost converter topology. In this topology, a main, or boost, inductor 16 operates in alternating first and second part cycles as determined by the switching operation of a MOSFET or other current switch 18, whose conductive state is controlled by circuitry 20. FIG. 2 illustrates the conduction states of current switch 18 during its first and second part cycles.

In a first part cycle 30, as shown in FIG. 2, switch 18 is conducting, or "on." During first part cycle 30, source 22 of d.c. power supplies power to main, or boost, inductor 16 through its left-shown node; during this part cycle, the right-hand shown node of main inductor 16 is shorted to ground via switch 18, which is then conducing, or "on." Source 22 may, of course, be rectified a.c. power. For the purposes of the invention, it is important to note that during first part cycle 30, the voltage across first winding 16A of main inductor 16 is substantially the voltage of d.c. source 22, a relatively low voltage of typically 12 volts. In fact, during first part cycle 30, first winding 16A of main inductor 16 reflects virtually the voltage of d.c. source 22.

During a second part cycle 31 of the conducting state of switch 18, as shown in FIG. 2, the switch is non-conducting, or "off." For the purposes of the invention, it is important to note that during this time, main inductor 16 reflects a voltage that approximately equals the voltage across the lamp, $V_L$, as reduced by the voltage of d.c. source 22. (The voltage drop across an exemplary p-n diode 24 and a pulse transformer winding 26B are negligible, except during lamp starting.) The lamp voltage $V_L$ is set by a boost capacitor 28 that is charged from main, or boost, inductor 16, as will be further described below. Typically, the lamp voltage $V_L$, is set to about 250 volts before lamp turn-on. After lamp turn-on, the lamp voltage typically falls to about 60 volts. Both the 250-volt and 60-volt values are considerably greater than a typical d.c. source voltage of, for instance, 12 volts. It is important to note that, accordingly, first winding 16A of boost inductor 16 reflects substantially the lamp voltage $V_L$ during second part cycle 31 of operation of switch 18.

As shown at in FIG. 2, first and second part cycles 30 and 31 collectively define a period P. Period P is cyclically repeated, as shown by the start of subsequent first part cycle 30' when switch 18 again conducts. First part cycle 30' starts a new period P.

In normal operation of main ballast circuit 14, which, by way of example, employs boost converter topology, boost inductor 16 becomes charged with energy during the mentioned first part cycles of the switching state of switch 18, in which the d.c. source voltage is applied across first winding 16A. During the mentioned second part cycles of switch 18, the energy stored in boost inductor 16 is provided, via p-n diode 24, to boost capacitor 28, which stores energy for powering the lamp. Control circuitry 20 (FIG. 1) for switch 18 controls the duration of period P (FIG. 2) of the first and second part cycles, and also the respective durations of the first and second part cycles within a period P. By so controlling the first and second part cycles of operation of switch 18, circuitry 20 regulates the transfer of energy from boost inductor 16 to boost capacitor 28. In this manner, circuitry 20 maintains a desired voltage on boost capacitor 28, and hence on the lamp. Circuitry 20 is per se conventional.

As mentioned previously, high pressure discharge lamp 10 requires in excess of 15,000 volts to cause it to turn on. Such high voltage is provided in pulse form by novel starting circuit 12. Circuit 12 includes a spark gap device 32, including a spark gap 33, and is non-conductive until a relatively high breakdown voltage of, for instance, 1,000 volts, is impressed across the device. The dielectric isolation between a pair of spaced terminals that define spark gap 33 breaks down, and renders the device conductive.

The starting circuit, or what can be referred to as a voltage generating circuit 12, includes a starting capacitor 34 as well as a circuit arrangement for charging the starting capacitor 34. Starting circuit 12 employs a capacitor 34, which is charged from an extra winding 16B on main inductor 16. Winding 16B is poled in such manner as to supply capacitor 34 with current via a one-way current valve, such as a p-n diode 36, during the mentioned second part cycles of operation of switch 18, when first winding 16A reflects substantially the lamp voltage. With the lamp voltage being at a relatively high level before starting, e.g. 250 volts, capacitor 34 repetitively receives energy from main inductor 16 during the second part cycles. The voltage on capacitor 34 sequentially increases in a staircase fashion as a result of the repeated second part cycles. When capacitor 34 reaches the breakdown voltage of spark gap device 32, such device is rendered conductive. This completes a circuit in which capacitor 34 abruptly discharges through spark gap device 32 and a primary winding 26A of a pulse transformer 26. With the secondary-to-primary winding turns ratio of transformer 26 being high, e.g. 50-to-1, a very high voltage, in excess of 15,000 volts, is induced across secondary winding 26B. With boost capacitor 28 acting as a transient short-circuit at this time, most of the high voltage induced on secondary winding 16B is placed across lamp 10, to facilitate turn-on of the lamp.

If the lamp does not turn on upon receiving a first high-voltage pulse, starting circuit 12 automatically restarts the above-described procedure of sequentially increasing the voltage on capacitor 34, during the mentioned second part cycles of switch 18, until the breakdown voltage of spark gap device 32 is again reached. A high-voltage pulse is again impressed across the lamp to facilitate its starting. This process beneficially continues automatically until lamp turn-on is achieved.

Once the lamp turns on, its voltage drops considerably, e.g., from 250 to 60 volts. Accordingly, during the mentioned second half cycles, starting winding 16B of main inductor 16 is at a proportionately decreased voltage. Such reduced voltage is insufficient to charge capacitor 34 up to the breakdown voltage of spark gap device 32. Beneficially, then, starting circuit 12 remains in an idle condition during normal lamp operation. If, however, lamp 10 should lose its arc discharge state, i.e., were it to turn off, the lamp voltage $V_L$ would again rise to e.g., 250 volts, and the correspondingly increased voltage across winding 16B will sequentially charge capacitor 30 up to the breakdown voltage of spark gap device 32. This initiates an automatic re-start procedure in the same manner as the original start procedure described above.

Starting circuit 12 beneficially employs considerably fewer parts than the prior art starting circuit mentioned in the "Background of the Invention," above. Secondary winding 16B is merely an extra winding placed on already existing main inductor 16. Only four additional parts are needed to complete a typical starting circuit 12: i.e., pulse transformer 26, spark gap device 32, capacitor 34, and p-n diode 36. In addition, the stress levels imposed on the components of main ballast circuit 14 during the lamp-starting process are, beneficially, no greater than the stress levels during steady state operation of the lamp, and only occur for a very brief duration of lamp operation. As such, circuit reliability is maintained.

In addition to being applicable to the boost converter topology of FIG. 1, the present invention is applicable to a variety of ballast circuit topologies wherein (1), during a first part cycle of a current switch in which the switch is conductive, energy flows from a source of d.c. voltage to a first winding of a main inductor, and such first winding has applied across it substantially the d.c. source voltage, and (2), during second part cycles of the current switch in which the switch in non-conductive, such winding reflects substantially the lamp voltage. Other appropriate circuit topologies include a forward converter, a bridge converter, a half-bridge converter, a Cuk converter, a buck-boost converter and a flyback converter. Application of the present invention to the last-mentioned topology (i.e. flyback converter) is now described.

In a preferred modification to the circuit of FIG. 1, the number of winding turns of starting winding 16B can be reduced in the following manner. The connection between the right end of winding 16B and the bottom of capacitor 34 is broken, as indicated by the "X" in the figure. The right end of winding 16B is then connected by conductor 50, shown in phantom, to the right end of winding 16A. Meanwhile, the bottom of capacitor 34 is connected to the top of d.c. source 22 by conductor 52, shown in phantom.

Referring to FIG. 3, a ballast circuit with a flyback converter topology is shown. Starting circuit 12' of the circuit of FIG. 3 may be configured in substantially the same manner as starting circuit 12 of FIG. 1. Accordingly, like reference numerals as between the starting circuits of FIGS. 2 and 3 refer to like parts. Further, many of the parts of main ballast circuit 14' in FIG. 3 correspond at least generally to the like-numbered parts in FIG. 1.

Switch 18' of the FIG. 3 circuit operates under control of circuitry 20' to produce first and second part cycles 30 and 31, respectively, in the same manner as shown in FIG. 2 for the boost converter circuit of FIG. 1.

Referring again to FIG. 3, during a first part cycle of switch operation, d.c. source 22' impresses its voltage across a first winding 16A' of main, or flyback, inductor 16'. This is because, during such part cycles, switch 18' is conducting, or on. During such first part cycles, the currents in windings 16B' and 16C' are zero, because the polarity of these windings is such that diodes 36' and 24' are blocked by reverse voltage. Energy is stored in main inductor 16' during this time.

During the second part cycles of switch operation, when switch 18' is off, respective voltages are induced in windings 16B' and 16C', with the voltage on winding 16C' being limited by the voltage on flyback capacitor 28', which is essentially at the lamp voltage $V_L$. Since the voltage on first winding 16A' is proportional to the voltage on secondary winding 16C', the voltage on first winding 16A' substantially reflects the lamp voltage during the second part cycles.

The flyback converter circuit of FIG. 3 may have exemplary voltage values of 12 volts for d.c. source 22', 60 volts for lamp voltage $V_L$ during steady state operation, and 250 volts for lamp voltage $V_L$ prior to lamp starting. Control circuitry 20' for switch 18' adjusts the periodicity and respective proportions of first and second part cycles of switch operation to maintain such voltages, as is also the case with the boost converter circuit of FIG. 1. In the same manner as with the boost converter circuit of FIG. 1, the lamp "off" voltage of e.g., 250 volts, is reflected onto starting capacitor 34', via windings 16C' and 16B'. Starting capacitor 34' sequentially charges during the second part cycles of switch operation, to reach the breakdown voltage of spark gap device 32', of, for instance, 1,000 volts. As with spark gap device 32 of FIG. 1, spark gap device 32' of FIG. 3 conducts momentarily to allow an abrupt discharge of capacitor 34' through primary winding 26A' of pulse transformer 26'. Pulse transformer 26' provides on secondary winding 26B' a high voltage in excess of 15,000 volts, and typically in excess of 20,000 volts. Capacitor 28' is a transient short-circuit at this time, so that the pulse is applied mostly across the lamp to facilitate lamp turn-on.

As with the boost converter circuit of FIG. 1, so long as the lamp in FIG. 3 remains off, with capacitor 28' at a relatively high level of, e.g., 250 volts, starting capacitor 34' becomes sequentially charged during the second part cycles of switch operation to provide automatic re-starting. In similar manner, if the lamp should accidentally turn off, starting circuit 12' provides an automatic re-starting procedure.

When the lamp is turned on, and flyback capacitor 28' is at a relatively low voltage such as 60 volts, a proportionately lower voltage is induced in winding 16B' of starting circuit 12' as compared to the lamp starting period in which the voltage on capacitor 28' was at a relatively high level of, e.g., 250 volts. Such decreased level of voltage on winding 16B' is insufficient to charge starting capacitor 34' sufficiently to reach the breakdown voltage of spark gap device 32'. Starting circuitry 12' thus becomes automatically idled during steady state lamp operation.

As with the boost converter circuit of FIG. 1, moreover, the flyback converter of FIG. 3 shares the benefit of reduced parts count for its starting circuit, without sacrificing reliability of operation.

In a preferred modification to the circuit of FIG. 3, the number of winding turns of starting winding 16B' can be reduced in the following manner. The connection between the right end of winding 16B' and the bottom of capacitor 34' is broken, as indicated by the "X" in the figure. The lower end of winding 16B' is then connected by conductor 50', shown in phantom, to the upper end of winding 16C'. Meanwhile, the bottom capacitor 34' is connected to the lower end of winding 16C' by conductor 52', shown in phantom.

Exemplary values for the boost converter circuit of FIG. 1, incorporating the preferred modification involving conductors 50 and 52, are as follows: d.c. source 22, 12 volts; boost inductor 16, 100 microhenries;

winding 16A, 50 turns; winding 16B, 150 turns; switch 18, an N-channel MOSFET with component no. IRF 250 sold by International Rectifier Company of El Segundo, Calif.; capacitor 34, 0.1 microfarads; spark gap device 32, component no. FX1X-1 sold by Siemens of Germany, with a breakdown voltage of 1,000 volts; boost capacitor 28, 2 microfarads; pulse transformer 26, 700 microhenries; pulse transformer winding 26A, 2 turns; and pulse transformer winding 26B, 130 turns; with control circuitry 20 controlling switch 18 to provide on boost capacitor 28 a voltage of 60 volts while the lamp is on, and voltage of 250 volts when the lamp is off.

Exemplary component values for the flyback converter circuit of FIG. 3, incorporating the preferred modification involving conductors 50′ and 52′ are as follows: d.c. source 22′, 12 volts; flyback inductor 16′, 100 microhenries; winding 16A′ 50 turns; winding 16B′, 150 turns; winding 16C′, 50 turns; switch 18′, an N-channel MOSFET with component no. IRF 250 sold by International Rectifier Company of El Segundo, Calif.; capacitor 34′, 0.1 microfarads; spark gap device 32′, component no. FX1X-1 sold by Siemens of Germany, with a breakdown voltage of 1,000 volts; boost capacitor 28′, 2 microfarads; pulse transformer 26′, 700 microhenries; pulse transformer winding 26A′, 2 turns; and pulse transformer winding 26B′, 130 turns; with control circuitry 20′ controlling switch 18′ to provide on boost capacitor 28′ a voltage of 60 volts while the lamp is on, and voltage of 250 volts when the lamp is off.

From the foregoing, it will be appreciated that the present invention provides an electronic ballast circuit for a high pressure discharge lamp with a reduced parts-count starting circuit. Greater economy, without loss of reliability, is attained. Additionally, automatic idling of the start circuitry during lamp operation, and automatic restarting of the lamp, are provided.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. An electronic ballast circuit for a high pressure gas discharge lamp with a reduced parts-count starting circuit, comprising:
    (a) means for supplying d.c. voltage from a d.c. source;
    (b) a main inductor for receiving energy from the d.c. source and supplying said energy to the lamp; said inductor having a plurality of windings; a first winding of said inductor being coupled to receive energy from the d.c. source;
    (c) current-switching means being conductive during periodic first part cycles for transferring energy from the d.c. source to said main inductor, and being non-conductive during periodic second part cycles; a first part cycle being followed by a second part cycle in successive periods of switching operation of said current-switching means;
    (d) said first winding of said main inductor having impressed across it substantially the d.c. source voltage during the first part cycles, and reflecting substantially the lamp voltage during the second part cycles; and
    (e) a starting circuit for providing a pulse in excess of 15,000 volts across the lamp to facilitate starting the lamp; said starting circuit comprising a spark gap device, a pulse transformer, and a voltage-generating circuit;
    (f) said spark gap device including a spark gap that has a breakdown voltage at which said device conducts to provide a pulse of current;
    (g) said pulse transformer having a primary winding coupled to said spark gap device for receiving the pulse of current, and having a secondary winding coupled to the lamp for applying to the lamp a voltage in excess of 15,000 volts while the pulse is present, so as to facilitate starting of the lamp; and
    (h) said voltage-generating circuit being effective for impressing across said pulse-generating device a voltage that reaches the breakdown voltage of said spark gap during a lamp start-up period, resulting in a pulse of current through said spark gap device; said voltage-generating circuit comprising:
        (i) a starting capacitor for storing energy and impressing across said spark gap an increasing voltage, which reaches the breakdown voltage of said spark gap during a lamp start-up period; and
        (ii) a circuit for charging said starting capacitor, comprising a one-way current valve and a starting winding of said main inductor coupled to said starting capacitor via said one-way current valve, so as to be effective to charge said capacitor with energy from said main inductor during the second part cycles.

2. The ballast circuit of claim 1, wherein said circuit for charging said starting capacitor further comprises said starting winding being serially coupled to a further winding of said main inductor, so as to minimize the number of windings turns needed in said starting winding.

3. The ballast circuit of claim 1, further comprising a main capacitor coupled to receive energy from said main inductor at a rate determined by switching of said current-switching means between its first and second part cycles.

4. The ballast circuit of claim 1, wherein the starting circuit is effective for providing a pulse in excess of 20,000 volts across the lamp to facilitate starting the lamp.

5. An electronic ballast circuit for a high pressure gas discharge lamp with a reduced parts-count starting circuit, comprising:
    (a) means for supplying d.c. voltage from a d.c. source;
    (b) a boost inductor for receiving energy from the d.c. source and supplying said energy to the lamp; said inductor having a plurality of windings; a first winding of said inductor being coupled to receive energy from the d.c. source;
    (c) current-switching means being conductive during periodic first part cycles for transferring energy from the d.c. source to said boost inductor, and being non-conductive during periodic second part cycles; a first part cycle being followed by a second part cycle in successive periods of switching operation of said current-switching means;
    (d) a boost capacitor coupled to said first winding of said boost inductor to receive energy from said boost inductor at a rate determined by switching of said current-switching means between its first and second part cycles;

(e) said first winding of said boost inductor having applied to it substantially the d.c. source voltage during the first part cycles, and reflecting substantially the lamp voltage during the second part cycles; and (f) a starting circuit for providing a pulse in excess of 15,000 volts across the lamp to facilitate starting the lamp; said starting circuit comprising a spark gap device, a pulse transformer, and a voltage-generating circuit;

(g) said spark gap device including a spark gap that has a breakdown voltage at which said device conducts to provide a pulse of current;

(h) said pulse transformer having a primary winding coupled to said pulse-generating device for receiving the pulse of current, and having a secondary winding coupled to the lamp for applying to the lamp a voltage in excess of 15,000 volts while the pulse is present, so as to facilitate starting of the lamp; and (i) said voltage-generating circuit being effective for impressing across said pulse-generating device a voltage that reaches the breakdown voltage of said spark gap during a lamp start-up period, resulting in a pulse of current through said spark gap device; said voltage-generating circuit comprising:

(i) a starting capacitor for storing energy and impressing across said spark gap an increasing voltage, which reaches the breakdown voltage of said spark gap during a lamp start-up period; and (ii) a circuit for charging said starting capacitor, comprising a one-way current valve and a starting winding of said boost inductor coupled to said starting capacitor via said one-way current valve, so as to be effective to charge said capacitor with energy from said boost inductor during the second part cycles.

6. The ballast circuit of claim 5, wherein said circuit for charging said starting capacitor further comprises said starting winding being serially coupled to said first winding of said boost inductor, so as to minimize the number of windings turns needed in said starting winding.

7. The ballast circuit of claim 5, wherein the starting circuit is effective for providing a pulse in excess of 20,000 volts across the lamp to facilitate starting the lamp.

8. The ballast circuit of claim 5, wherein the high pressure discharge lamp comprises a metal halide lamp.

9. The ballast circuit of claim 5, wherein the high pressure discharge lamp comprises a xenon metal halide lamp.

10. An electronic ballast circuit for a high pressure gas discharge lamp with a reduced parts-count starting circuit, comprising:

(a) means for supplying d.c. voltage from a d.c. source;

(b) a flyback inductor for receiving energy from the d.c. source and supplying said energy to the lamp; said inductor having a plurality of windings; a first winding of said inductor being coupled to receive energy from the d.c. source;

(c) current-switching means being conductive during periodic first part cycles for transferring energy from the d.c. source to said flyback inductor, and being non-conductive during periodic second part cycles; a first part cycle being followed by a second part cycle in successive periods of switching operation of said current-switching means;

(d) a capacitor coupled to a second winding of said flyback inductor to receive energy from said flyback inductor at a rate determined by switching of said current-switching means between its first and second part cycles;

(e) said first winding of said flyback inductor having impressed across it substantially the d.c. source voltage during the first part cycles, and reflecting substantially the lamp voltage during the second part cycles; and (f) a starting circuit for providing a pulse in excess of 15,000 volts across the lamp to facilitate starting the lamp; said starting circuit comprising a spark gap device, a pulse transformer, and a voltage-generating circuit;

(g) said spark gap device including a spark gap that has a breakdown voltage at which said device conducts to provide a pulse of current;

(h) said pulse transformer having a primary winding coupled to said pulse-generating device for receiving the pulse of current, and having a secondary winding coupled to the lamp for applying to the lamp a voltage in excess of 15,000 volts while the pulse is present, so as to facilitate starting of the lamp; and (i) said voltage-generating circuit being effective for impressing across said pulse-generating device a voltage that reaches the breakdown voltage of said spark gap during a lamp start-up period, resulting in a pulse of current through said spark gap device; said voltage-generating circuit comprising:

(i) a starting capacitor for storing energy and impressing across said spark gap an increasing voltage, which reaches the breakdown voltage of said spark gap during a lamp start-up period; and (ii) a circuit for charging said starting capacitor, comprising a one-way current valve and a starting winding of said flyback inductor coupled to said starting capacitor via said one-way current valve, so as to be effective to charge said capacitor with energy from said flyback inductor during the second part cycles.

11. The ballast circuit of claim 10, wherein said circuit for charging said starting capacitor further comprises said starting winding being serially coupled to said second winding of said flyback inductor, so as to minimize the number of windings turns needed in said starting winding.

12. The ballast circuit of claim 10, wherein the starting circuit is effective for providing a pulse in excess of 20,000 volts across the lamp to facilitate starting the lamp.

13. The ballast circuit of claim 10, wherein the high pressure discharge lamp comprises a metal halide lamp.

* * * * *